United States Patent
Carraro

(10) Patent No.: US 9,950,398 B2
(45) Date of Patent: Apr. 24, 2018

(54) NC MACHINES WITH IMPROVED WORKTABLE

(71) Applicant: PROMAC SRL, Salzano (VE) (IT)

(72) Inventor: Lucio Carraro, Salzano (IT)

(*) Notice: Subject to any disclaimer, the term of this patent is extended or adjusted under 35 U.S.C. 154(b) by 0 days.

(21) Appl. No.: 14/782,326

(22) PCT Filed: Apr. 9, 2014

(86) PCT No.: PCT/IB2014/060547
§ 371 (c)(1),
(2) Date: Oct. 4, 2015

(87) PCT Pub. No.: WO2014/191848
PCT Pub. Date: Dec. 4, 2014

(65) Prior Publication Data
US 2016/0067839 A1    Mar. 10, 2016

(30) Foreign Application Priority Data
May 27, 2013  (IT) .............. PD2013A0149

(51) Int. Cl.
*B23Q 1/01* (2006.01)
*B23Q 1/58* (2006.01)
(Continued)

(52) U.S. Cl.
CPC .......... *B23Q 1/015* (2013.01); *B23Q 1/56* (2013.01); *B23Q 1/58* (2013.01); *B23Q 1/623* (2013.01);
(Continued)

(58) Field of Classification Search
CPC . B23Q 1/01; B23Q 1/017; B23Q 1/62; B23Q 1/48; B23Q 1/015; B23Q 1/56; B23Q 1/58; B23Q 1/623; B23Q 1/625; B23Q 1/626; B23Q 1/4852; B23Q 1/4857; B23Q 5/22; B23Q 37/00; B23Q 39/026; B23Q 39/02; B23B 3/06; B23B 3/16; B23B 3/00; B23B 17/00; Y10T 409/305768; Y10T 409/309576
See application file for complete search history.

(56) References Cited

U.S. PATENT DOCUMENTS 5,127,140 A * 7/1992 Oiwa .............. B23B 3/167
                                              29/27 C
5,738,572 A    4/1998 Giebmanns
(Continued)

FOREIGN PATENT DOCUMENTS

DE    10019669 A1    10/2001
DE    10348459 A1    6/2005
(Continued)

OTHER PUBLICATIONS

DE 100 19 669 Machine Translation, pp. 6-12, Sep. 6, 2016.*

*Primary Examiner* — Sunil K Singh
*Assistant Examiner* — Nicole N Ramos
(74) *Attorney, Agent, or Firm* — Themis Law

(57) ABSTRACT

A numerical control machine includes a bearing structure-frame suited to support various other parts, at least one lower surface, at least one table suited to hold a workpiece and mounted on the lower surface, and at least one head with an electric tool-holding spindle, wherein the lower surface is inclined.

5 Claims, 1 Drawing Sheet

(51) Int. Cl.
  *B23Q 1/62* (2006.01)
  *B23Q 1/56* (2006.01)
  *B23Q 11/00* (2006.01)
(52) U.S. Cl.
  CPC . *B23Q 11/0053* (2013.01); *Y10T 409/304088* (2015.01); *Y10T 409/305768* (2015.01); *Y10T 409/308288* (2015.01); *Y10T 409/309576* (2015.01)

(56) References Cited

U.S. PATENT DOCUMENTS

| | | | | |
|---|---|---|---|---|
| 6,626,075 B2* | 9/2003 | Hirose | ............... | B23B 3/168 82/118 |
| 6,637,302 B2* | 10/2003 | Miyano | ............... | B23Q 1/015 82/1.11 |
| 6,640,677 B2* | 11/2003 | Ueda | ............... | B23B 3/06 29/27 C |
| 6,640,678 B2* | 11/2003 | Kumano | ............... | B23B 3/167 82/117 |
| 7,219,407 B2* | 5/2007 | Schneider | ............... | B23B 3/065 29/27 C |
| 7,451,533 B2* | 11/2008 | Kawasumi | ............... | B23B 3/167 29/27 C |

FOREIGN PATENT DOCUMENTS

| | | | |
|---|---|---|---|
| GB | 2040203 A | | 8/1980 |
| JP | 10138064 A | * | 5/1998 |

* cited by examiner

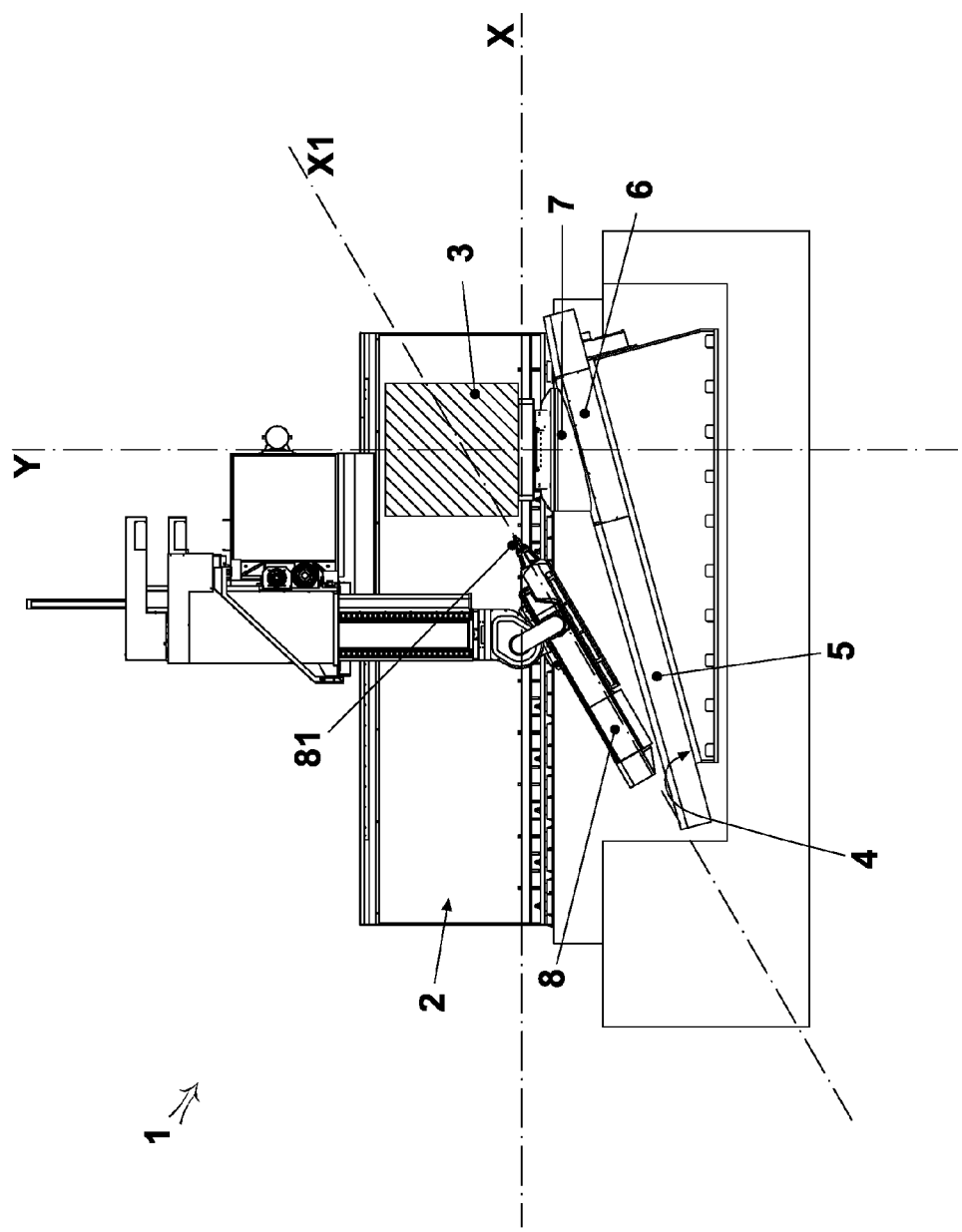

NC MACHINES WITH IMPROVED WORKTABLE

The present invention concerns NC machines for machining pieces, and in particular it concerns NC machines provided with a table that is rotated and translated on an inclined plane.

NC machining centres are known which comprise a support or table where the piece to be machined is blocked, a head with an electric spindle on which the machining tool is mounted, head translation and rotation systems intended to allow the tool to work on all sides and all angles on the piece blocked on the worktable.

Suitable programmable electronic circuits control all the movements of the machining centres, like for example the rotation speed of the tool, the translation and/or rotation of the table on which the piece to be machined is blocked, the translation and/or rotation of the spindle.

The machining centres made up as described above are commonly called CNC machining centres, that is computerized numerical control machining centres.

The CNC machining centres used at present comprise a lower plane and the table, on which the piece to be machined is blocked, is mounted thereon.

At present said lower plane is horizontal and fixed, while the supporting table can rotate the piece for the execution of processing cycles with axial symmetry on the piece itself.

The head with tool-holding spindle can perform a plurality of movements in such a way as to machine the piece on horizontal planes, in all the radial directions, and on generically inclined and vertical planes but machining the piece from top to bottom.

On the contrary, to machine the piece from bottom to top, for example to make holes or undercuts from the bottom, the head should be lowered towards the supporting plane and the spindle and also the tool should be oriented in the direction defined by the type of machining to be performed.

Said operation cannot be carried out if the lower part of the piece must be machined, as the head cannot be lowered under a given height due to the presence of the lower supporting surface.

In this case it is necessary to remove the piece from the table and place it in a different position in order to carry out the desired type of machining.

This operation obviously requires the interruption of the processing cycle with a consequent increase of production times.

In order to overcome the drawbacks described above, a new type of NC machine has been designed and constructed, which is provided with a worktable that is rotated and translated on an inclined plane.

The main object of the present invention is to provide a NC machine that allows the workpiece to be machined in any direction, with no need to re-position the workpiece on the table.

It is another object of the present invention to provide a NC machine in which the position of the workpiece can be changed through the controlled and automatic movement of the worktable.

These and other direct and complementary objects are achieved by the new type of NC machine whose worktable is rotated and translated on an inclined plane, comprising in its main parts a bearing structure-frame that supports the various other parts, a lower surface that is inclined with respect to the horizontal plane, a slide travelling on guides mounted on said inclined lower surface, a piece-holding table mounted on said slide and a head provided with a tool-holding spindle.

Said guides on which said slide travels are substantially oriented in the direction of inclination of the lower surface, so that said slide, when travelling, varies its height, thus positioning both the piece-holding table and the piece to be machined at the desired height.

In this way, the head with the tool-holding spindle can be positioned at a lower height with respect to the workpiece, in order to allow the workpiece to be machined from bottom to top, with no need to re-position the workpiece manually as is the case with the NC machines of the known type.

Said piece-holding table, furthermore, is suited to handle the piece and in particular it is at least suited to rotate the piece on a generically vertical axis.

Said electric spindle is constituted by a spindle with jaws or couplings suited to hold and rotate a machining tool, typically a milling bit.

Said electric spindle is constrained to a head that in turn is formed by a system of moving arms suited to support said electric spindle on said structure-frame as well as to translate and rotate said electric spindle on the main axes.

The invention includes a tool crib suited to contain the tools and supply the electric spindle with the tool that is necessary from time to time, depending on the type of machining to be performed.

All of the moving members are controlled by a programmable electronic circuit, typically a computer, suited to detect the position of each member as well as to control the movement and/or rotation of each member.

The characteristics of the new NC machine will be highlighted in greater detail in the following description, with reference to the attached drawing that is provided by way of non-limiting example.

The attached drawing shows a practical embodiment of the invention by way of example without limitation.

FIG. 1 shows the new NC machine.

The new machine comprises a bearing structure (1) comprising a chamber (2) in which the workpiece (3), schematically shown in the FIGURE, is machined.

The new machine comprises a lower surface (4), inclined with respect to the horizontal plane generically indicated as plane (X), and a head (8) provided with a tool-holding spindle (81).

On said inclined lower surface (4) there is at least one guide (5) suited to allow the sliding movement of at least one slide (6), wherein said guide (5) is oriented in the direction of inclination of the lower surface (4), preferably in the direction of maximum inclination.

A support or table (7) holding said workpiece (3) is mounted on said slide (6).

Said table (7) is translated together with said slide (6) with respect to the inclined lower surface (4) and can thus be positioned at different heights, even higher than the position of said head (8).

Said head (8) can thus orient the spindle (81) even in an inclined direction (X1) in order to machine the workpiece (3) from the bottom.

Said support or table (7) holding said workpiece (3) is at least suited to rotate the workpiece (3) around a vertical axis (Y).

These are the schematic outlines that are sufficient to the expert to implement the invention; consequently, when the invention is actually implemented variants can be produced that do not alter the substance of the innovative concept.

Therefore, with reference to the above description and the attached drawing, the following claims are expressed.

The invention claimed is:

1. A numerical control machine comprising:
    a bearing structure-frame;
    a single support surface coupled to the bearing structure-frame and inclined in relation to a ground on which said bearing structure-frame is disposed;
    at least one table adapted to hold a workpiece and slidingly mounted on said support surface; and
    at least one head having an electric tool-holding spindle and configured to orient the tool-holding spindle in a plurality of directions, said head being coupled to a moving arm extending downwardly along a longitudinal axis that is perpendicular to the ground and that is disposed above said support surface in relation to the ground, said head being detached from said support surface, said directions including a direction inclined in relation to the ground,
    wherein said table and said head are disposed in relation to one another so as to enable said head to access and operate on each side of said workpiece by causing said table to slide along said support surface according to the side of said workpiece to be accessed and operated on, and by further causing said arm to dispose said spindle next to the side of said workpiece to be accessed and operated on.

2. The numerical control machine according to claim 1, further comprising at least one slide travelling on guides mounted on said support surface, wherein said table holding the workpiece is mounted on said slide.

3. The numerical control machine according to claim 2, wherein said guides are substantially oriented according to a direction of inclination of said support surface, so that said slide, when travelling, varies its height, thus positioning also said table at a desired height with respect to a position of said head.

4. The numerical control machine according to claim 3, wherein said guides are oriented according to a direction of maximum inclination of said support surface.

5. The numerical control machine according to the claim 1, wherein said table is at least adapted to rotate the workpiece about an axis perpendicular to the ground.

* * * * *